(12) United States Patent
Papke

(10) Patent No.: US 7,169,887 B2
(45) Date of Patent: Jan. 30, 2007

(54) THERMOPLASTIC MOLDING MATERIAL AND MOULDED BODIES PRODUCED THEREFROM

(75) Inventor: Nicolai Papke, Mainz-Kastel (DE)

(73) Assignee: Ticona GmbH (DE)

( * ) Notice: Subject to any disclaimer, the term of this patent is extended or adjusted under 35 U.S.C. 154(b) by 0 days.

(21) Appl. No.: 10/506,541

(22) PCT Filed: Mar. 4, 2003

(86) PCT No.: PCT/EP03/02175

§ 371 (c)(1), (2), (4) Date: Oct. 6, 2004

(87) PCT Pub. No.: WO03/074612

PCT Pub. Date: Sep. 12, 2003

(65) Prior Publication Data

US 2005/0119396 A1    Jun. 2, 2005

(30) Foreign Application Priority Data

Mar. 5, 2002 (DE) .............................. 102 09 420

(51) Int. Cl.
*C08F 6/00* (2006.01)
(52) U.S. Cl. .................... 528/490; 264/219; 428/364
(58) Field of Classification Search ............... 264/219; 428/364; 528/490
See application file for complete search history.

(56) References Cited

U.S. PATENT DOCUMENTS

| 4,259,458 A | * | 3/1981 | Robeson ............... 525/68 |
| 4,417,018 A | * | 11/1983 | Ogawa et al. ........... 524/261 |
| 5,039,741 A | | 8/1991 | Burg et al. |
| 5,081,038 A | | 1/1992 | Sugaya et al. |
| 5,158,985 A | | 10/1992 | Köhler et al. |
| 5,834,056 A | | 11/1998 | Lutz |
| 6,090,319 A | | 7/2000 | Sharma et al. |
| 6,238,733 B1 | | 5/2001 | Therolf |

FOREIGN PATENT DOCUMENTS

| DE | 1 193 240 | 5/1965 |
| DE | 2 051 028 | 4/1971 |
| DE | 36 28 362 | 2/1987 |
| DE | 198 36 787 | 2/2000 |
| EP | 0 156 285 | 10/1985 |
| EP | 0 320 654 | 6/1989 |
| EP | 0 346 150 | 12/1989 |
| EP | 0 494 445 | 7/1992 |
| EP | 0 668 317 | 8/1995 |
| EP | 0 756 536 | 2/1997 |
| GB | 2 225 584 | 6/1990 |
| JP | 56-30451 | 3/1981 |
| JP | 60-104136 | 6/1985 |
| JP | 63-222266 | 9/1988 |
| JP | 63-305148 | 12/1988 |
| JP | 64-66268 | 3/1989 |
| JP | 2-107664 | 4/1990 |
| JP | 3-126740 | 5/1991 |
| JP | 6-18929 | 1/1994 |
| JP | 06073264 | 3/1994 |
| JP | 6-234896 | 8/1994 |
| JP | 7-53861 | 2/1995 |
| JP | 07082441 | 3/1995 |
| JP | 10060248 | 3/1998 |
| WO | WO-03/074610 | 9/2003 |

* cited by examiner

*Primary Examiner*—Terressa Boykin
(74) *Attorney, Agent, or Firm*—Connolly Bove Lodge & Hutz

(57) ABSTRACT

A thermoplastic molding composition is described comprising a) from 20 to 99% by weight of a thermoplastic polymer other than a polyoxymethylene homo- or copolymer, from 0.1 to 80% by weight of a filler and/or reinforcing material, and c) 0.00001 to 1.0% by weight of a catalyst which catalyzes the formation of covalent bonds between the thermoplastic polymer and the surface of the additive.

The inventive molding compositions have improved properties.

15 Claims, No Drawings

THERMOPLASTIC MOLDING MATERIAL AND MOULDED BODIES PRODUCED THEREFROM

The present invention relates to novel thermoplastic molding compositions with improved mechanical propeties.

Thermoplastics are low-cost materials with low density and good fusibility and ability to resist chemical effects. These materials are therefore widely used in sectors such as general household items, and electrical and electronic parts.

It is known that thermoplastics can be combined with reinforcing agents, with fillers, and/or with impact modifiers in order to improve their mechanical properties, such as strength or impact strength, or in order to reduce their price.

The use of reinforcing fibers in thermoplastics is known by way of example from GB-A-2,225,584, JP-A-03/126, 740, JP-A-02/107,664, JP-A-01/087,656740, JP-A-01/066, 268, JP-A-63/305,148, JP-A-06/018,929, JP-A-60/104,136, JP-A-56/030,451, JP-A-63/222,266, JP-A-07/053,861 and JP-A-06/234,896.

The effect of additives on the properties of the molding composition is affected by the coupling of the additives to the plastics matrix. It is therefore often the case that some additives are not suitable for all plastics, or are provided with sizes which bring about improved coupling to the plastics matrix.

The additives here, in particular reinforcing fibers, are coated with sizes, and these sized additives are incorporated into the molten polymer after drying of the size. In addition to the size, use is often also made of a coupling agent which is intended to improve the adhesion between the surface of the additive and the polymer matrix. However, this procedure is often inadequate.

A disadvantage with the use of sizes or coupling agents in the preparation filled and/or reinforced and/or impact-modified molding compositions is often that the bonding of polymer matrix to the relevant additive is still inadequate. Maximum bonding between these components of the molding composition is desirable.

Starting from the prior art, the object of the present invention consisted in the provision of filled and/or reinforced and/or impact-modified molding compositions composed of thermoplastics which have improved coupling of the additive phase to the polymer matrix. This improved coupling is apparent in increased surface adhesion and— dependent on the nature of the additive—in improved mechanical properties of the molding, and/or in improved dispersion of the additive within the polymer matrix.

Another object of the present invention consisted in the provision of filled and/or reinforced and/or impact-modified moldings composed of thermoplastic polymers, and also of molding compositions for producing these moldings in which the plastic suffers only very little degradation due to the addition of the additives, the moldings having higher stability and aging resistance, and low emission.

These objects are achieved via the compositions and moldings described below.

The present invention provides a thermoplastic molding composition comprising
a) from 20 to 99% by weight of a thermoplastic polymer other than a polyoxymethylene homo- or copolymer,
b) from 0.1 to 80% by weight of an additive selected from the group consisting of fillers, reinforcing materials, impact modifiers, and their mixtures, and
c) from 0.00001 to 1.0% by weight of a catalyst which catalyzes the formation of covalent bonds between the thermoplastic polymer and the surface of the additive.

In one preferred embodiment, the present invention provides a long-fiber-reinforced molding composition comprising
d) from 20 to 90% by weight of a thermoplastic polymer other than a polyoxymethylene homo- or copolymer;
e) from 10 to 80% by weight of a reinforcing fiber,
f) up to 1.0% by weight, preferably from 0.00001 to 0.5% by weight, of at least one catalyst which catalyzes a chemical reaction between the thermoplastic matrix polymer and the surface of the additive.

This type of molding composition has excellent bonding of the additive into the polymer matrix, and this can be discerned through high strength, excellent impact strength, and high tensile strain at break and weld seam strength.

The catalysts which may be used according to the invention are in principle any of the compounds which catalyze a chemical reaction in which covalent bonds form between the matrix polymer and the additive. This can either be the reaction of reactive groups of the matrix polymer with reactive groups on the surface of the additive, or else can involve chemical reactions in which covalent bonds are formed between coupling agents used and the polymer matrix and/or the surface of the additive, or in which covalent bonds form between two parts of a coupling agent, one part of which is compatible with the matrix polymer and the other part of which is compatible with the surface of the additive.

Examples of reactions catalyzed according to the invention for forming covalent bonds between the thermoplastic matrix polymers and the surface of the additive are any of the reactions in which covalent bonds form between identical or different reactive groups.

Examples of reactive groups are hydroxy, thiol, mercaptan, amine, ester, amide, anhydride, carboxy, carbonate, sulfonic acid, epoxy, urethane, thiourethane, isocyanate, allophanate, urea, biuret, lactone, lactam, oxazolidine, and carbodiimide groups, and halogen atoms.

Examples of chemical reactions are reactions between identical reactive groups, such as transesterification, transamidation or transurethanization reactions; or reactions between different reactive groups, such as ester formation, amide formation, or urethane formation, or formation of carbon-carbon bonds.

Catalysts which are used according to the invention are preferably compounds which catalyze transesterification, transamidation or transurethanization reactions, or which catalyze the formation of ester groups, amide groups, and urethane groups.

It is advantageous to use Lewis acids, which are particularly preferably not Brnsted acids.

According to the invention, the amounts used of these catalysts are from 0.00001 to 1.0% by weight, advantageously from 0.0005 to 0.5% by weight, and particularly advantageously from 0.0007 to 0.01% by weight, in particular from 0.0007 to 0.005% by weight, based on the total amount of the molding composition.

Examples of suitable catalysts are $MgX_2$, $BiX_3$, $SnX_4$, $SbX_5$, $FeX_3$, $GaX_3$, $HgX_2$, $ZnX_2$, $AlX_3$, $TiX_4$, $MnX_2$, $ZrX_4$, $[R_4N]^+_q A^{q-}$, $[R_4P]^+_q A^{q-}$ where X may be a halogen atom, i.e. I, Br, Cl or F, and/or an —OR or —R group, where R is alkyl or aryl, q is a whole number from 1 to 3, and A is a q-valent anion, such as halide, sulfate, or carboxylate.

It is also possible to use mixtures of various catalysts. Other, particularly advantageous catalysts are selected from the group consisting of phosphonium salts, phosphanes, ammonium salts, sulfonium salts, titanates, titanyl compounds, zirconates, and their mixtures.

Titanates and zirconates are preferably compounds of the formula I

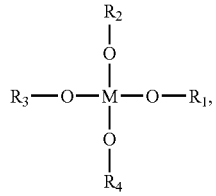

(I)

where M is titanium or zirconium and $R_1$, $R_2$, $R_3$, and $R_4$ are monovalent organic radicals which may be identical or different.

The radicals $R_1$ to $R_4$ may specifically be alkyl radicals having from 1 to 20 carbon atoms, where appropriate having substitution with one or more hydroxy or alkoxy groups and/or with halogen atoms, e.g. methyl, ethyl, hydroxyethyl, propyl, butyl, dodecyl, hexadecyl, or stearyl; aromatic groups, where appropriate having substitution with one or more hydroxy, alkoxy and/or alkyl groups and/or with halogen atoms, e.g. phenyl or naphthyl, or else condensed aromatic radicals, e.g. those derived from 2-halomethylnaphthalene, 9-halomethylanthracene, and 9-halomethylphenanthrene; araliphatic groups, where appropriate having substitution with one or more hydroxy, alkoxy and/or alkyl groups, and/or with halogen atoms, e.g. benzyl.

Titanates or zirconates which may be used advantageously are tetraalkyl titanates and tetraalkyl zirconates, where the $R_1$ to $R_4$ may be identical or different and are alkyl radicals having from 1 to 20 carbon atoms, advantageously from 2 to 10 carbon atoms, in particular from 3 to 8 carbon atoms.

Lower tetraalkyl titanates and lower tetraalkyl zirconates, e.g. titanium tetramethoxide, are often volatile, and therefore preference should mostly be given to the less volatile higher homologues, such as titanium tetrabutoxide.

Compounds which may be used advantageously are titanium tetrabutoxide, zirconium tetrabutoxide, tetrapentyl titanate, tetrapentyl zirconate, tetrahexyl titanate, tetraisobutyl titanate, tetraisobutyl zirconate, tetra-tert-butyl titanate, tetra-tert-butyl zirconate, triethyl tert-butyl titanate, triethyl tert-butyl zirconate, and similar compounds.

Other titanates or zirconates whose use is preferred are mixed oxides of the formulae $Mt_4TiO_4$, $Mt_2TiO_3$, $Mt_2Ti_2O_5$, $Mt_2Zr_3O_7$, $Mt_4ZrO_4$, $Mt_2ZrO_3$, $Mt_2Zr_2O_5$, and $Mt_2Zr_3O_7$, where Mt is a mono- or divalent metal, preferably an alkaline metal or an alkaline earth metal.

Titanyl compounds preferably have the structure $[MI^{p+}]_s$ $[TiO]^{2+}[A^{r-}]_t$, where p is 1 or 2, s is 0, 1 or 2, MI is a mono- or divalent metal, A is an r-valent anion, r and t, independently of one another, are 1 or 2, and $s*p+2$ is equal to $r*t$. Preferred values are p=1, s=0 or 2, r=1 or 2, and t=2.

M is preferably an alkali metal cation. A is preferably an anion of a mono- or dibasic carboxylic acid, such as acetic acid or oxalic acid.

An example of a titanyl compound whose use is preferred is potassium titanyl bisoxalate ($K_2[C_4O_9]Ti$).

Phosphonium salts may particularly advantageously be used as catalyst according to the invention.

Preferred phosphonium salts used according to the invention are compounds of the formula II

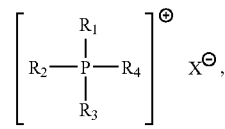

(II)

where $R_1$, $R_2$, $R_3$, and $R_4$ are identical or different, and may assume one of the definitions defined above, and where X may assume one of the definitions defined above.

Examples of particularly preferred phosphonium salts are 1-(acetylamino-2-phenylvinyl)triphenylphosphonium perchlorate, (1-benzoylamino-2,2-bis(4-chloro-phenylsulfanyl) vinyl)triphenyl-phosphonium chloride, (1-benzoylamino-2, 2-bisethylsulfanylvinyl)triphenylphosphonium chloride, (1-benzoylamino-2,2-bisphenylsulfanylvinyl)triphenylphosphonium chloride, 1-(benzoylamino-2,2-dichlorovinyl)triphenylphosphonium chloride, (1-benzoylamino-2,2-dichlorovinyl)triphenylphosphonium iodide, (1-benzoylamino-2-(4-chlorophenyl)vinyl)triphenylphosphonium chloride, (1-benzoylamino-2-(4-chlorophenylsulfanyl)vinyl)triphenylphosphonium chloride, (1-benzoylamino-2-(4-nitrophenyl)vinyl)triphenylphosphonium chloride, (1-benzoylamino-2-chlorovinyl)triphenylphosphonium chloride, (1-benzoylamino-2-chloro-2-ethylsulfanylvinyl)triphenylphosphonium chloride, tetraphenylphosphonium chloride, tetrabutylphosphonium chloride, dimethylbehenylphosphonium chloride, trimethyldodecylphosphonium chloride, trimethyloctadecylphosphonium chloride, trimethylhexadecylphosphonium chloride, tetrabutylphosphonium chloride, stearyltributylphosphonium chloride, tetraethylphosphonium bromide, tetrabutylphosphonium bromide, dimethylbehenylphosphonium bromide, trimethyldodecylphosphonium bromide, trimethyloctadecylphosphonium bromide, trimethylhexadecylphosphonium bromide, tetrabutylphosphonium bromide, stearyltributylphosphonium bromide.

Very particularly preferred phosphonium salts bear, as at least one of the radicals $R_1$ to $R_4$, an aryl radical, advantageously at least one phenyl radical, e.g. tetraphenylphosphonium chloride or tetraphenylphosphonium bromide.

Particularly preferred phosphonium salts contain, as radicals $R_1$ to $R_4$, both aromatic and aliphatic radicals, in particular three aryl radicals, such as phenyl radicals.

Examples of this group last mentioned are ethyltriphenylphosphonium chloride, ethyltriphenylphosphonium bromide.

Other suitable compounds are known to the person skilled in the art, and are readily obtainable and, by way of example, can be found at http://www.sigma-aldrich.com.

Other catalysts which may likewise be used are the ammonium and sulfonium salts defined by analogy with formula II, and also phosphanes.

Preferred phosphanes are compounds of the formula III

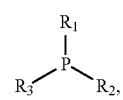

(III)

where the radicals $R_1$ to $R_3$ may be identical or different and are defined by analogy with the radicals $R_1$ to $R_3$ of the phosphonium salts represented in formula II.

Triphenylphosphane, $P(C_6H_5)_3$, is particularly advantageous.

The amounts used of the ammonium salts, sulfonium salts, and phosphanes, and also in particular the phosphonium salts, may advantageously be from 0.00001 to 0.03% by weight, particularly advantageously from 0.0005 to 0.025% by weight, very particularly advantageously from 0.0007 to 0.005% by weight.

However, since the mixing and homogeneous dispersion process is more difficult at very low concentrations (most for amounts markedly below 5 ppm), the amounts mostly used of these compounds are from 0.001 to 0.003% by weight.

For the purposes of the invention, the term thermoplastic polymers includes in principle any of the known, synthetic, natural, and modified natural polymers other than polyoxymethylene homo- or copolymers, capable of processing by melt extrusion.

By way of example, mention may be made of:

polylactones, such as poly(pivalolactone), poly(caprolactone);

polyurethanes, such as the polymerization products of the diisocyanates, e.g. of naphthalene 1,5-diisocyanate; p-phenylene diisocyanate, m-phenylene diisocyanate, tolylene 2,4-diisocyanate, tolylene 2,6-diisocyanate, diphenylmethane 4,4'-diisocyanate, 3,3'-dimethylbiphenyl 4,4'-diisocyanate, diphenylisopropylidene 4,4'-diisocyanate, 3,3'-dimethyldiphenyl 4,4'-diisocyanate, 3,3'-dimethyldiphenylmethane 4,4'-diisocyanate, 3,3'-dimethoxybiphenyl 4,4'-diisocyanate, dianisidine diisocyanate, toluidine diisocyanate, hexamethylene diisocyanate, 4,4'-diisocyanatodiphenylmethane, hexamethylene 1,6-diisocyanate, or dicyclohexylmethane 4,4'-diisocyanate, with polyesters derived from long-chain diols, for example with poly(tetramethylene adipate), poly(ethylene adipate), poly(butylene 1,4-adipate), poly(ethylene succinate), poly(butylene 2,3-succinate), with polyether diols, and/or with one or more diols such as ethylene glycol, propylene glycol, and/or with polyether diols derived from one or more diols, such as diethylene glycol, triethylene glycol, and/or tetraethylene glycol;

polycarbonates, such as poly[methanebis(phenyl 4-carbonate)], poly[1,1-etherbis(phenyl 4-carbonate)], poly[diphenylmethanebis(phenyl 4-carbonate)], poly[1,1-cyclohexanebis(phenyl 4-carbonate)];

polysulfones, such as the reaction product of the sodium salt of 2,2-bis(4-hydroxyphenyl)propane or of 4,4'-dihydroxydiphenyl ether with 4,4'-dichlorodiphenyl sulfone;

polyethers, polyketones, and polyether ketones, such as polymerization products of hydroquinone, of 4,4'-dihydroxybiphenyl, of 4,4'-dihydroxybenzophenone, or of 4,4'-dihydroxydiphenylsulfone with dihalogenated, in particular difluorinated or dichlorinated, aromatic compounds of the type represented by 4,4'-dihalodiphenyl sulfone, 4,4'-dihalodibenzophenone, bis(4,4'-dihalobenzoyl)benzene, 4,4'-dihalobiphenyl;

polyamides, such as poly(4-aminobutanoate), poly(hexamethyleneadipamide), poly(6-aminohexanoate), poly(m-xylyleneadipamide), poly(p-xylylenesebacamide), poly(2,2,2-trimethylhexamethyleneterephthalamide), poly(meta-phenyleneisophthalamide) (NOMEX), and poly(p-phenyleneterephthalamide) (KEVLAR);

polyesters, such as poly(ethylene 1,5-naphthalate), poly(cyclohexane-1,4-dimethylene terephthalate), poly(ethylene oxybenzoate) (A-TELL), poly(parahydroxybenzoate) (EKONOL), poly(cyclohexylidene-1,4-dimethylene terephthalate) (KODEL), polyethylene terephthalate, and polybutylene terephthalate;

poly(arylene oxides), such as poly(2,6-dimethylphenylene 1,4-oxide), and poly(2,6-diphenylphenylene 1,4-oxide);

liquid-crystalline polymers, such as the polycondensation products from the group of monomers consisting of terephthalic acid, isophthalic acid, naphthalene-1,4-dicarboxylic acid, naphthalene-2,6-dicarboxylic acid, biphenyl-4,4'-dicarboxylic acid, 4-hydroxybenzoic acid, 6-hydroxy-2-naphthalenedicarboxylic acid, hydroquinone, 4,4'-dihydroxybiphenyl, and 4-aminophenol;

poly(arylene sulfides), such as poly(phenylene sulfide), poly(phenylene sulfide ketone), and poly(phenylene sulfide sulfone);

polyetherimides;

vinyl polymers and their copolymers, such as polyvinyl acetate, polyvinyl chloride, polyvinyl butyral, polyvinylidene chloride, and ethylene-vinyl acetate copolymers;

polyacrylic derivatives, such as polyacrylate and also polymethacrylate and their copolymers and derivatives, such as polyethyl acrylate, poly(n-butyl acrylate), polymethyl methacrylate, polyethyl methacrylate, poly(n-butyl methacrylate), poly(n-propyl methacrylate), polyacrylonitrile, water-insoluble ethylene-acrylic acid copolymers, water-insoluble ethylene-vinyl alcohol copolymers, acrylonitrile copolymers, methyl methacrylate-styrene copolymers, ethylene-ethyl acrylate copolymers, acrylonitrile-butadiene-styrene copolymers;

polyolefins, such as poly(ethylene), for example low-density poly(ethylene) (LDPE); linear low-density poly(ethylene) (LLDPE) or high-density poly(ethylene) (HDPE); poly(propylene), chlorinated poly(ethylene), for example chlorinated low-density poly(ethylene); poly(4-methyl-1-pentene), poly(styrene);

water-insoluble ionomers; poly(epichlorohydrin);

Furan polymers, such as poly(furan);

cellulose esters, such as cellulose acetate, cellulose acetate butyrate, cellulose propionate;

silicones, such as poly(dimethylsiloxane), poly(dimethylsiloxane-co-phenylmethylsiloxane);

Protein thermoplastics;

and also all of the mixtures and alloys (miscible and immiscible blends) of two or more of the polymers mentioned.

For the purposes of the invention, thermoplastic polymers also encompass thermoplastic elastomers derived, for example, from one or more of the following polymers:

polyurethane elastomers, fluoroelastomers, polyester elastomers, polyvinyl chloride, thermoplastic butadiene-acrylonitrile elastomers, thermoplastic poly(butadiene), poly(isobutylene), ethylene-propylene copolymers, thermoplastic ethylene-propylene-diene terpolymers, thermoplastic sulfonated ethylene-propylene-diene terpolymers, poly(chloroprene), thermoplastic poly(2,3-dimethylbutadiene), thermoplastic poly(butadiene-pentadiene), chlorosulfonated poly(ethylene), block copolymers, built up from segments of amorphous or of (semi)crystalline blocks, such as poly(styrene), poly(vinyltoluene), poly(tert-butylstyrene), polyesters, and of elastomeric blocks, such as poly(butadiene), poly(isoprene), ethylene-propylene copolymers, ethylene-butylene copolymers, ethylene-isoprene copolymers, and hydrogenated derivatives of these, e.g. SEBS, SEPS, SEEPS, and also hydrogenated ethylene-isoprene copolymers with a relatively high proportion of 1,2-linked isoprene, polyethers, styrene polymers such as ASA (acrylonitrile-styrene-acrylate), ABS (acrylonitrile-butadiene-styrene) or PC/ABS (polycarbonate/ABS), and the like, e.g. the products marketed with the trade name KRATON® by Kraton Polymers, and also any of the mixtures and alloys (miscible and immiscible blends) of two or more of the polymers mentioned.

Use may also advantageously be made of block copolymers which contain blocks having functional groups capable of reaction with the additives.

Materials which may likewise advantageously be used as matrix polymer or in particular as additives to the matrix polymer are grafted copolymers in which functional groups which become involved in one of the reactions mentioned above, such as transesterification reactions, are present in a side chain; these are in particular modified polyolefins, particularly modified polyethylene or modified polypropylene. The modified polyolefin preferably contains at least one of the following groups: carboxy, carboxylic anhydride, metal carboxylate, carboxylic ester, imino, amino, or epoxy group, advantageously at from 1 to 50% by weight.

Examples of these polyolefins having functional groups encompass modified polyolefin copolymers or grafted copolymers which are produced by chemical grafting of the following compounds listed by way of example, e.g. maleic anhydride, citric anhydride, N-phenylmaleimide, N-cyclohexylmaleinimide, glycidyl acrylate, glycidyl methacrylate, glycidyl vinylbenzoate, N-[4-(2,3-epoxypropoxy)-3,5-dimethylbenzyl] acrylamide (AXE), or alkyl(meth)acrylates onto polyolefins, such as polypropylene, polyethylene, or ethylene-propylene copolymers, or onto polyamide. There is no restriction on the degree of polymerization of the modified polymer, and it may also be an oligomer.

Particularly preferred modified polyolefins are maleic anhydride-modified polyethylene, maleic-anhydride-modified polypropylene, maleic-anhydride-modified polyethylene-polypropylene copolymer, glycidyl-methacrylate-modified polyethylene, glycidyl-methacrylate-modified polypropylene, AXE-modified polyethylene, AXE-modified polypropylene, and polyamide-grafted polyolefins.

It is very particularly advantageous to use polymers which are obtainable via transesterification reactions, transamidation reactions, or transurethanization reactions, or whose repeat unit contains at least one group which can become involved in this type of reaction or a similar reaction.

The thermoplastic polymers which may be used with particular advantage and contain functional groups which can become involved in transesterification, transamidation or transurethanization reactions can advantageously be used in a mixture with polymers which contain functional groups which cannot become involved in reactions of this type, thus improving their coupling to the additive.

A method which can be used advantageously for producing, by way of example, short-fiber-reinforced thermoplastics structures using polypropylene is the addition of at least one modified polyolefin and/or polyamide to the polypropylene to be used.

Thermoplastic polymers to be used with very particular advantage are polyamides, polyesters, polycarbonates, polyarylene sulfides, modified polyolefin, and also blends and alloys of polypropylene with at least one of the abovementioned thermoplastic polymers to be used with very particular advantage.

Preferred thermoplastic polymers used according to the invention are the thermoplastic polyarylene sulfides known per se. Suitable materials are described by way of example in Saechtling, Kunststoff-Taschenbuch [Plastics Handbook], Hanser-Verlag, 27$^{th}$ edition, pages 495–498, incorporated herein by way of reference.

According to the invention, polyphenylene sulfide is preferably used as polyarylene sulfide.

Polyphenylene sulfide (PPS) is a semicrystalline polymer having the formula IV:

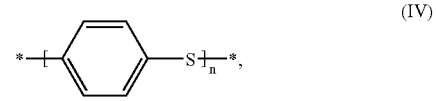

where n>1 and the molar mass ($M_w$) of the polymer is at least >200 g/mol.

Other thermoplastic polymers whose use is preferred are polyesters which contain polymerized units derived from esters of at least one aromatic dicarboxylic acid, in particular terephthalic acid, isophthalic acid, or 2,6-naphthalenedicarboxylic acid, and from at least one aliphatic diol, in particular ethylene glycol, 1,3-propanediol or 1,4-butanediol, or which contain polymerized units of tetrahydrofuran. Examples of suitable polyesters according to the invention are described in Ullmann's Encyclopedia of Ind. Chem., ed. Barbara Elvers, Vol. A24, Polyester section (pages 277–251) VCH Weinheim-Basle-Cambridge-New York (1992), incorporated herein by way of reference.

Particularly advantageous materials are polyesters such as polyethylene terephthalate, polybutylene terephthalate, and copolyesters which contain butylene terephthalate units and butylene isophthalate units.

The polyesters may also have been modified by adding small amounts of aliphatic dicarboxylic acids during the polycondensation process, examples being glutaric acid, adipic acid, or sebacic acid, or by adding polyglycols, examples being diethylene glycol or triethylene glycol, or other relatively high-molecular-weight polyethylene glycols. The polyesters may moreover contain other polymerized units derived from hydroxy carboxylic acids, in particular from hydroxy benzoic acid or from hydroxy naphthalenecarboxylic acid. Polycarbonates are known materials and are described by way of example in Saechtling, Kunststoff-Taschenbuch [Plastics Handbook], 27$^{th}$ edition 1998, Hanser Verlag, pages 479–485, incorporated herein by way of reference. By way of example, polycarbonates may be prepared by reacting bisphenol A with phosgene, or by melt condensation of diphenyl carbonate with bisphenol A. Other possible comonomers are bisphenol TMC and bisphenol S (dihydroxydiphenyl sulfide). The flame retardance of materials of this type can be improved via use of halogenated bisphenol derivatives, in particular of brominated bisphenol derivatives.

Preferred polycarbonates have the formula V

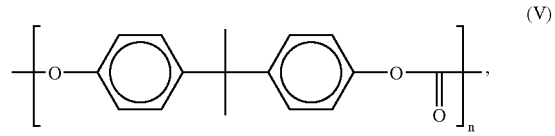

and may also contain repeat units of the formula VI

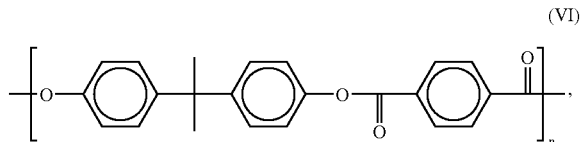

where n is greater than 1, preferably from 2 to 10 000.

n is particularly preferably within a range such that the average molar mass of the polymer does not exceed 30 000 g/mol.

The materials may also contain bisphenol units which have substitution on the aromatic ring, for example with bromine, or which bear various aliphatic radicals on the carbon atom which connects the two aromatic rings (materials comprising bisphenol TMC), or whose aromatic rings have connection by a heteroatom, such as sulfur (materials comprising bisphenol S).

The polyamides suitable according to the invention are described by way of example in Sachtling, Kunststoff-Taschenbuch [Plastics Handbook], 27$^{th}$ edition 1998, Hanser Verlag, pages 465–478, incorporated herein by way of reference.

Preferred polyamides have the formula VII

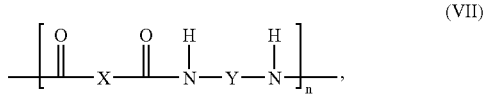
(VII)

where X and Y may be identical or different, and are a divalent aromatic and/or aliphatic hydrocarbon radical. The divalent aromatic hydrocarbon radicals are generally a radical with meta- or para-linkage, and, where appropriate, having substitution, for example with alkyl groups or with halogen atoms. The aliphatic hydrocarbon radicals are preferably linear and unbranched, or else cyclic. The aliphatic hydrocarbon radicals are preferably linear and unbranched and have from 4 to 13 carbon atoms.

Particular preference is given to the use of polyamides where X is a linear, aliphatic hydrocarbon radical having 4, 7, 8 or 10 carbon atoms, and in which Y is a linear, aliphatic hydrocarbon radical having 4 or 6 carbon atoms.

In another advantageous embodiment, X is a meta- and/or para-phenylene radical and Y is a linear, aliphatic hydrocarbon radical having 6 carbon atoms, and/or a 2,2-dimethyl-4-methylhexyl radical.

n is greater than 1, preferably from 2 to 1 000, in particular from 80 to 100.

Other advantageous polyamides have the formula VIII

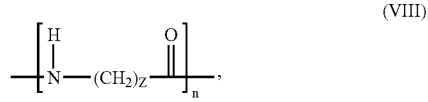
(VIII)

where Z is 5, 10, or 11, and n is greater than 1, preferably from 2 to 1 000, in particular from 80 to 100.

The properties of these materials, and also their preparation, are known to the person skilled in the art.

Particularly preferred examples are polyamides obtained via polycondensation of dicarboxylic acids, such as oxalic acid, adipic acid, suberic acid, sebacic acid, terephthalic acid, isophthalic acid, or 1,4-cyclohexyldicarboxylic acid, with a diamine, such as ethylenediamine, pentamethylenediamine, hexamethylenediamine, decamethylenediamine, 1,4-cyclohexyldiamine, or m-xyloldiamine, or polyamides obtained via polymerization of a cyclic lactam, such as caprolactam or laurolactam, and polyamides obtained via copolymerization of a cyclic lactam and a dicarboxylic salt with a diamine.

Advantageous materials are nylon-6, nylon-6,6, and their copolymers.

Suitable fillers and/or reinforcing materials and/or impact modifiers for use in the inventive compositions are generally any of the additives which are present in a separate phase in the polymer matrix and whose surface can be covalently bonded to the polymer matrix via a chemical reaction. These may be typical reinforcing materials, such as fibers, tapes, films, or fiber sheet structures, or typical fillers used mainly for economic reasons, e.g. mineral fillers, or else fillers used to give the composition a desired property, e.g. to achieve a reinforcing effect, or else impact modifiers. These additives have advantageously been provided with a size or have been surface-treated, in order to improve coupling to the plastics matrix.

This is particularly advantageous in the case of mineral fillers and reinforcing fibers.

Mineral fillers which may be used advantageously are chalk, calcium carbonate, glass beads, hollow glass beads, talc, wollastonite, loam, molybdenum disulfide and/or graphite.

Reinforcing fibers which may be used advantageously are mineral fibers, such as glass fibers, polymer fibers, in particular organic high-modulus fibers, such as aramide fibers, or metal fibers, such as steel fibers, or carbon fibers.

These fibers may be modified fibers or unmodified fibers, e.g. provided with a size or chemically treated, in order to improve adhesion to the plastic.

Glass fibers are particularly preferred. For treatment of glass fibers use is mostly made of organic silanes, in particular aminosilanes. Examples of specific aminosilanes which may be used are 3-trimethoxysilylpropylamine, N-(2-aminoethyl)-3-aminopropyltrimethoxysilane, N-(3-trimethoxy-silanyl-propyl) ethane-1,2-diamine, 3-(2-aminoethylamino)propyltrimethoxysilane, N-[3-(trimethoxysilyl) propyl]-1,2-ethanediamine.

Sizes based on polyurethanes may also be used advantageously.

Methods known per se can be used to incorporate the reinforcing fibers into the thermoplastic, for example an extruder or kneader.

However, the reinforcing fibers may also advantageously be impregnated or sheathed in the form of continuous-filament fibers with the molding composition composed of thermoplastic, in a process suitable for this process, and then wound up or processed in the form of a continuous strand, or chopped to a desired pellet length, so that the fiber lengths and pellet lengths are equal. An example of a process particularly suited to this purpose is the pultrusion process.

According to the invention, the long-fiber-reinforced thermoplastic molding composition may be a glass fiber bundle which has been sheathed by one or more layers of the thermoplastic matrix polymer in such a way that the fibers have not been impregnated, and that mixing of the fibers and the thermoplastic matrix polymer does not occur until processing has begun, for example injection molding. However, the fibers have advantageously been impregnated by the thermoplastic matrix polymer.

In one preferred embodiment of the invention, the long-fiber-reinforced polyacetal molding composition is prepared by the pultrusion process, where i) fiber bundles are conducted through a flat die charged with a melt made from at least one thermoplastic polymer other than polyacetal and, where appropriate, from other additives, ii) the immersed fiber bundles are conducted through a shaping die, iii) the fiber bundles are cooled, iv) the fiber bundles are postformed, and v) the fiber bundles are cut to the length of the structure perpendicular to their running direction, or are wound up in the form of a continuous structure.

The impregnation of the fiber bundles with the thermoplastic matrix polymer, for example via pultrusion in step i) of the above process, may also take place by other suitable processes. For example, the fibers may be impregnated by a process in which the fiber bundle is saturated by a thermoplastic matrix polymer, wherein the fiber bundle is laid onto carrier equipment, and wherein the carrier equipment, together with the fiber bundle lying thereon, is conducted through impregnating equipment. A process of this type is described in EP-A-756 536.

The fiber may also be impregnated by a process in which a plastifying extruder is used and a fiber strand is conducted by way of guide apertures and preheating equipment and is wetted with a liquid-film of thermoplastic polymer in an impregnating apparatus and then is introduced into the plastifying extruder in which the individual fibers are chopped and mixed, the mixture being discharged in the form of a fiber-reinforced thermoplastic polymer composition capable of further processing, wherein the following steps are used:

a) passing by way of coating nozzles into the inlet of the plastifying extruder, and preferably parallel to the extruder axes and approximately tangentially, the fiber strand is wound up onto an extruder screw and around the extruder screws in an advancing direction, and also drawn into holes in the extruder barrel, whose diameter has been enlarged by at least four times the thickness of the fiber strand, where b) in the inlet the right-hand coating nozzle directly applies a film of thermoplastic polymer to one flat side of the fiber strand, while application to the second flat side takes place indirectly by pressing the fiber strand into the liquid film of thermoplastic polymer previously applied from the left-hand coating nozzle to the screw shaft, whereupon the individual continuous-filament fibers are subjected to impregnating or penetrating action at the extruder screws on both flat sides of the fiber strand in an inlet and impregnating section and these sides are wetted or saturated by the liquid films of thermoplastic polymer, c) and then the fiber strand or the individual fibers thoroughly saturated or thoroughly impregnated with thermoplastic polymer are passed out of the inlet and impregnation section by way of a cutting edge into the short discharge and conveying section of a reduced-diameter barrel, and thus chopped into substantially predetermined lengths.

An example of the process of this type is described in DE-A-1 98 36 787.

The environmentally compatible and cost-effective process described of the invention gives a small rod-shaped structure of a certain shape. The length of the rod-shaped structure is from 3 to 100 mm, preferably from 4 to 50 mm, and particularly preferably from 5 to 15 mm. The diameter of the rod-shaped structure, also termed a pellet, is generally from 1 to 10 mm, from 2 to 8 mm, and particularly preferably from 3 to 6 mm.

The invention also provides a process where the components are mixed in an extruder, and the reinforcing fiber is wetted by the melt, and the resultant material is then pelletized. The resultant pellets may be mixed with dye and/or pigment and further processed to give the component.

According to the invention, the long-fiber-reinforced thermoplastic polymer molding composition may also be produced by the compounding process or by the direct process. It is particularly advantageous that the direct process does not give a rod-shaped structure which has to be shaped in another step of the process to give a molded article; instead, the molded article, reinforced with long reinforcing fibers (the length of the reinforcing fibers here being from 3 to 100 mm) is obtained directly from reinforcing fibers and from the thermoplastic matrix polymer -which comprises the catalyst.

According to the invention, a molded article is molded from the molten, where appropriate colored, long-fiber-reinforced thermoplastic polymer pellets in a manner known per se, e.g. injection molding, extrusion, blow molding, or plastification with compression.

According to the invention, the structure of the long-fiber-reinforced thermoplastic polymer molding composition has the shape of a rod, strip, ribbon, or sheet. The shape is preferably that of a rod, obtained by using thermoplastic polymer to coat the surface of the fiber and therefore of the bundle composed of fiber, arranged continuously and parallel, to give a strand, and then by cutting the product to the required length.

According to the invention, any of the components other than the reinforcing fiber may be mixed in the melt in a kneader or an extruder. The temperature is set above the melting point of the higher-melting thermoplastic polymer by from 5 to 100° K, preferably from 10 to 60° K. The mixing of the melt is complete after a period of from 30 seconds to 15 minutes, preferably from 1 minute to 10 minutes.

The nature of the long-fiber-reinforced thermoplastic polymer molding composition may also be such that there is substantial wetting of the fibers by the thermoplastic polymer or by a blend of thermoplastic polymer, and sheathing of the impregnated fiber strand in the middle of the long-fiber-reinforced thermoplastic polymer molding composition by another component, preferably a different thermoplastic or a blend, with bonding of the components to one another at the surface. A structure of this type may be produced by a process such as that described in U.S. Pat. No. 6,090,319, for example.

This type of long-fiber-reinforced thermoplastic polymer molding composition may be produced by after fiber impregnation by one of the processes described above, drawing the impregnated fiber strand continuously out of the impregnation apparatus;

continuously melting the material intended for sheathing the long-fiber-reinforced thermoplastic polymer molding composition, and extruding it in the plastic state, as required by the length, through an elongate extrusion die with a completely open tubular passage in which the material intended for sheathing the thermoplastic polymer molding composition is present;

continuously conveying the impregnated fiber strand into and through said elongate extrusion die, while at the same time the material intended for sheathing the impregnated fiber strand is extruded;

and bringing the impregnated fiber strand into contact with the molten material intended for sheathing the long-fiber-reinforced thermoplastic polymer molding composition, and coating it, and obtaining a long-fiber-reinforced thermoplastic polymer molding composition in which there is substantial wetting of the fibers only by one of the components, and the impregnated fiber strand in the middle of the long-fiber-reinforced thermoplastic polymer molding composition has been sheathed by the respective other component, and the components have been bonded to one another at the surface;

continuously removing the long-fiber-reinforced thermoplastic polymer molding composition from the extrusion die; and cutting the fiber bundles to give the length of the structure perpendicularly to their running direction, or winding them up in the form of a continuous structure.

When this process is used, the reinforcing fibers are impregnated by a known process, preferably by the pultrusion process, with one of the components, which, where appropriate, may comprise one or more other additives. The resultant structure is then coated with the other component, which in each case may also comprise one or more other additives.

The reinforcing fibers are preferably wetted by the component which advantageously comprises the catalyst, and the resultant strand is then sheathed by the other component, and this component, too, may comprise other additives.

The other additives present in the components spatially separate from one another here are advantageously different.

According to the invention, the thermoplastic polymer molding composition, in particular the long-fiber-reinforced thermoplastic polymer molding composition is used to produce moldings. These moldings have excellent mechanical properties, in particular excellent impact strength, high heat resistance, and low deformability. The moldings also have improved accuracy of fit, due to low warpage.

The moldings may be produced from the inventive long-fiber-reinforced thermoplastic polymer molding compositions by the known processing methods, for example via injection molding, compression molding, or blow molding.

Other advantageous additives which are used according to the invention are impact modifiers. The catalysts used according to the invention also improve the compatibility and the dispersibility of the impact modifiers in the polymer matrix, giving higher impact strengths.

This takes place "in situ", i.e. during the melt kneading procedure a coupling reaction is promoted catalytically between the thermoplastic polymer and available functionalities of the impact modifier, producing what may be called a block copolymer, which acts as a compatibilizer across the phase boundary to improve thermodynamic miscibility and therefore compatibility within the mixture.

The amounts typically used of impact modifiers are from 5 to 50% by weight, preferably from 5 to 40% by weight, particularly preferably from 7 to 30% by weight. Preferred materials used as impact modifier, individually or in the form of a mixture, are polyurethanes, two-phase mixtures of polybutadiene and styrene-acrylonitrile (ABS), modified polysiloxanes or silicone rubbers, or graft copolymers of an elastomeric, single-phase core based on polydiene and of a hard graft shell (core-shell structure).

In the latter case, impact modifiers are composed of particles most of which, preferably more than 70% of which, have a structure composed of core and shells. The core here is formed from an elastomeric polymer phase onto which has been grafted the hard shell, which may also be composed of two or more layers. The core is preferably single-phase, and this means that the core is composed mainly, preferably completely, of the elastomeric soft phase and comprises only small amounts of, preferably no, inclusions of hard polymer constituents of the shell. The graft copolymer is mostly composed of from 40 to 95% by weight, advantageously from 60 to 90% by weight, particularly advantageously from 70 to 80% by weight, of the elastomeric core. The proportion of the shells is from 5 to 60% by weight, advantageously from 10 to 40% by weight, particularly advantageously from 20 to 30% by weight.

These impact modifiers and their structure are known per se and are described by way of example in EP-A-156,285 and EP-A-668,317, expressly incorporated herein by way of reference.

Other impact modifiers whose use is preferred are polyurethanes, preferably thermoplastic polyurethanes. These are known products described by way of example in DE-A-119 32 40, DE-U-205 10 28, and in Kunststoff-Taschenbuch [Plastics Handbook], (Saechtling, 27$^{th}$ edition, Hanser Verlag 1998), pp. 523–542, incorporated herein by way of reference.

They are prepared in a known manner via polyaddition of polyisocyanates, in particular diisocyanates, polyesters, polyethers, polyesteramides, polyacetals, or other suitable hydroxy or amino compounds, e.g. hydroxylated polybutadiene, or mixtures of the abovementioned compounds. Where appropriate, use is also made of chain extenders, such as low-molecular-weight polyols, in particular diols, polyamines, in particular diamines, or water.

The polyurethanes used according to the invention are preferably thermoplastic and therefore preferably in essence non-crosslinked, i.e. capable of repeated melting without exhibiting any significant decomposition.

Their reduced specific viscosities, measured at 30° C. in dimethylformamide, are generally from 0.5 to 3 dl/g, preferably from 1 to 2 dl/g. The values for tensile strain at break are advantageously from 800 to 1500%, preferably from 1000 to 1500%, while the Shore A hardness is at most 90, advantageously not above 81, preferably from 50 to 85, particularly preferably from 60 to 80, in particular from 65 to 80, and the glass transition temperatures are mostly not higher than 0° C., advantageously not higher than −10° C., particularly advantageously not higher than −20° C.

The thermoplastic molding compositions according to the invention may optionally comprise amounts which are mostly up to 40% by weight of other additives, individually or in the form of a mixture. Examples of materials which may be used are tribological auxiliaries, antioxidants, such as sterically hindered phenol compounds, UV stabilizers, such as benzotriazole derivatives and benzophenone derivatives, additives which confer conductivity or antistatic agents, such as carbon blacks, in particular conductive carbon blacks, acid scavengers, coupling agents, demolding aids, nucleating agents, such as talc, colorants, such as inorganic pigments, e.g. titanium dioxide, ultramarine blue, cobalt blue, or organic pigments and dyes, such as phthalocyanines, anthraquinones, lubricants, such as soaps and esters, e.g. stearyl stearate, montanic esters, partially saponified montanic esters, stearic acids, polar and/or non-polar polyethylene waxes, poly-α-olefin oligomers, silicone oils, polyalkylene glycols, and perfluoroalkyl ethers, polytetrafluoroethylene, or other additives, such as ultrahigh-molecular-weight polyethylene, and thermoplastic or thermoset polymer additives, elastomers, and other polymers.

EXAMPLES

The examples below are intended to illustrate the invention for the person skilled in the art and to disclose further advantageous embodiments, but without restricting the scope of protection.

The base material used for experiments 1 to 7 comprised polybutylene terephthalate (PBT) from Ticona GmbH. Other auxiliaries used comprised 0.65% by weight of a mixture comprising nucleating agent, antioxidant, and demolding aid.

Experiment 1 is the comparative example. Experiments 2 to 7 are inventive examples.

The base material used for experiments 8 to 10 comprised polyethylene terephthalate (PET) from Ticona GmbH. Other auxiliaries used comprised 0.6% by weight of a mixture comprising antioxidant and demolding aid. Experiment 8 is the comparative example. Experiments 9 and 10 are inventive examples.

The catalyst used in experiment 2 comprised tetra-n-butyl titanate(IV), that used in experiment 3 comprised potassium titanium oxide oxalate dihydrate, that used in experiment 4 comprised tetraphenylphosphonium bromide, and that used in experiment 5 comprised stearyltributyl-phosphonium bromide, and that used in experiment 6 comprised triphenylphosphin, and that used in experiment 7 comprised lithium acetylacetonate. The catalysts used in experiments 9 and 10 comprised potassium titanium oxide oxalate dihydrate.

The amounts stated in the table are in percentage by weight (% by weight). Tensile strength and tensile modulus of elasticity are in MPa, tensile strain at break is in %, and impact strengths are in kJ/m$^2$.

The constituents are mixed together with glass fibers and then melted in a twin-screw extruder, homogenized, drawn off in the form of a strand, and pelletized.

Test specimen production: the polyester pellets were injection molded to give standard test specimens and characterized in accordance with the methods listed below:

Tensile strength, tensile strain at break, and tensile modulus of elasticity were determined by the ISO 527 tensile test.

Charpy notched impact strength was determined to ISO 179-1/1 eA for notched test specimens by the tensile impact test.

Viscosity number was determined to ISO 1628-5 using dichloroacetic acid (DCA). The amount used for determination was 1.0% instead of 0.5%, deviating from the standard mentioned. MVR was determined with ISO 1133.

Tables 1 and 2 give the ingredients of the molding compositions and the corresponding test results.

TABLE 1

| Constituent/properties | Method | Unit | 1 | 2 | 3 | 4 | 5 | 6 | 7 |
|---|---|---|---|---|---|---|---|---|---|
| PBT | | % by weight | 79.35 | 79.28 | 79.28 | 79.28 | 79.28 | 79.28 | 79.28 |
| Additives | | % by weight | 0.65 | 0.65 | 0.65 | 0.65 | 0.65 | 0.65 | 0.65 |
| Glass fiber | | % by weight | 20 | 20 | 20 | 20 | 20 | 20 | 20 |
| n-butyl titanate(IV) | | % by weight | | 0.07 | | | | | |
| Potassium titanium oxide oxalate dihydrate | | % by weight | | | 0.07 | | | | |
| P(Ph)$_4$Br | | % by weight | | | | 0.07 | | | |
| Stearyltributylphosphonium bromide | | % by weight | | | | | 0.07 | | |
| P(Ph)$_3$ | | % by weight | | | | | | 0.07 | |
| Lithium acetylacetonate | | % by weight | | | | | | | 0.07 |
| Viscosity number | 1% DCA | ml/g | 112.1 | 120.9 | 121.5 | 113.9 | 117.8 | 117.6 | 118.7 |
| MVR | 250/2 | cm$^3$/10 min | 16.3 | 15.2 | 15.1 | 23.7 | 18.8 | 15.1 | 17.2 |
| Tensile strength | 5 mm/min | N/mm$^2$ | 117 | 122 | 121 | 119 | 121 | 121 | 121 |
| Tensile strain at break | 5 mm/min | % | 2.8 | 2.8 | 2.9 | 2.4 | 2.4 | 2.8 | 2.8 |
| Tensile modulus of elasticity | 1 mm/min | N/mm$^2$ | 7062 | 7411 | 7298 | 7412 | 7528 | 7293 | 7271 |
| Notched impact strength (Charpy, 23° C.) | Notched | kJ/m$^2$ | 5.9 | 6.6 | 6.5 | 6.6 | 6.6 | 6.5 | 6.6 |

TABLE 2

| Constituent/properties | Method | Unit | 8 | 9 | 10 |
|---|---|---|---|---|---|
| PET | | % by weight | 69.4 | 69.395 | 69.37 |
| Glass fiber | | % by weight | 30 | 30 | 30 |
| Additives | | % by weight | 0.6 | 0.6 | 0.6 |
| Potassium titanium oxide oxalate dihydrate | | % by weight | 0 | 0.005 | 0.03 |
| Viscosity number of pellets | 1% DCE | ml/g | 69.4 | 69.7 | 71.1 |
| Tensile strength | ISO 527 | MPa | 161 | 164 | 164 |
| Tensile strain at break | ISO 527 | % | 2.08 | 2.09 | 2.14 |
| Tensile modulus of elasticity | ISO 527 | MPa | 10906 | 11002 | 11104 |
| Notched impact strength (Charpy, 23° C.) | ISO 179-1/1eA | kJ/m$^2$ | 8.5 | 8.5 | 8.4 |

The invention claimed is:

1. A thermoplastic molding composition comprising
   a) from 20 to 99% by weight of a thermoplastic polymer selected from the group consisting of polyolefin, modified polyolefin; polyacrylate, polymethacrylate, polymers produced via polymerization of esters and/or amides of acrylic or methacrylic acid, and also their copolymers, polyamide, polyester, polycarbonate, polyether, polytbioether, polyphenylene oxide, polyarylene sulfides, and their mixtures
   b) from 10 to 80% by weight of a reinforcing fiber and
   c) from 0.00001 to 1.0% by weight of a phosphane, sulfonium salt or a titanyl compound and/or 0.00001 to 0.03% by weight of a phosphonium salt or ammonium salt or their mixtures as a catalyst which catalyzes the formation of covalent bonds between the thermoplastic polymer and the surface of the additive.

2. The thermoplastic molding composition as claimed in claim 1, wherein the amount of component a) is from 20 to 99% by weight, and that of component c) is phosphane, sulfonium salt or a titanyl compound in an amount from 0,00001 to 0.5% by weight.

3. The thermoplastic molding composition as claimed in claim 1, wherein use is made of a catalyst or a mixture of catalysts which catalyzes transesterification, transamidation, or transurethanization reactions, or catalyzes the formation of ester groups, amid groups, and urethane groups.

4. The thermoplastic molding composition as claimed in claim 1, wherein the catalyst is a Lewis acid and is not a Bronsted acid.

5. The thermoplastic molding composition as claimed in claim 1, wherein the catalyst is selected from the group consisting of ethyltriphenylphosphonium bromide, tetraphenylphosphonium bromide, tetrabutylphosphonium bromide, stearyl-tributylphosphonium bromide, triphenylphosphane, and their mixtures.

6. The thermoplastic molding composition as claimed in claim 1, wherein the long-fiber-reinforced thermoplastic molding composition is a glass fiber bundle which has been sheathed by one or more layers of the thermoplastic matrix polymer, so that the fibers have been impregnated with the thermoplastic matrix polymer.

7. The thermoplastic molding composition as claimed in claim 6, wherein the glass fiber bundle has been wetted by the thermoplastic polymer or by a blend of thermoplastic polymers, and the impregnated glass fiber bundle has been sheathed by another component, and the impregnated glass fiber bundle and the other component have been bonded to one another at tie surface.

8. A molded article obtainable via shaping of a thermoplastic molding composition as claimed in claim 1.

9. The polyacetal molding composition as claimed in claim 1, wherein the catalyst is a titanyl compounds of the structure $[Ml^{p+}]_s[TiO]^{2+}[A^{r-}]_t$, wherein
is 1 or 2,
s is 0, 1 or 2,
Ml is a mono- or divalent metal,
A is an r-valent anion,
r and t, independently of one another, are 1 or 2, and
s*p+2 is equal to r*t.

10. The polyacetal molding composition as claimed in claim 9, wherein

Ml is an alkali metal,
A is an acetic acid or oxalic acid,
p=1,
s=0 or 2,
r=1 or 2, and
t=2.

11. The polyacetal molding composition as claimed in claim 1, wherein the catalyst is
phosphonium salts which are compounds of the formula II

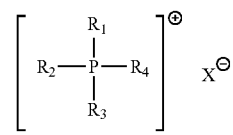

where $R_1$, $K_2$, $R_3$, and $R_4$ are identical or different, and are monovalent organic radicals,
X is be a halogen atom, and/or an —OR or —R group, where R is ailcyl or aryl.

12. The polyacetal molding composition as claimed in claim 11, wherein
$R_1$ to $R_4$ are identical or different and have from 2 to 10 carbon atoms and at least one of the radicals $R_1$ to $R_4$, is an aryl radical.

13. The polyacetal molding composition as claimed in claim 1, wherein the catalyst is
phosphanes of the formula IIa

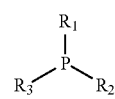

where the radicals $R_1$ to $R_3$ are identical or different, and are monovalent organic radicals.

14. A thermoplastic molding composition as claimed in claim 1, wherein the thermoplastic polymer is a polyester.

15. A thermoplastic molding composition as claimed in claim 1, wherein the amount of component c) is 0,0001 to 0,03% by weight of a catalyst selected from the group consisting of phosphonium salt, phosphane, sulfonium salt, ammonium salt or their mixtures.

* * * * *

UNITED STATES PATENT AND TRADEMARK OFFICE
CERTIFICATE OF CORRECTION

| | | |
|---|---|---|
| PATENT NO. | : 7,169,887 B2 | Page 1 of 1 |
| APPLICATION NO. | : 10/506541 | |
| DATED | : January 30, 2007 | |
| INVENTOR(S) | : Nicolai Papke | |

It is certified that error appears in the above-identified patent and that said Letters Patent is hereby corrected as shown below:

Column 16, line 63, "polyether, polytbioether, polyphenelyne oxide, pol-" should read -- polyether, polythioether, polyphenelyne oxide, pol- --.

Column 17, line 14, "of ester groups, amid groups, and urethane groups." should read -- of ester groups, amide groups, and urethane groups. --.

Column 17, line 36, "one another at tie surface." should read -- one another at the surface. --.

Column 17, line 42, "is 1 or 2" should read -- p is 1 or 2 --.

Column 18, line 20, "where $R_1$, $K_2$, $R_3$, and $R_4$ are identical or different, and" should read -- where $R_1$, $R_2$, $R_3$, and $R_4$ are identical or different, and --.

Column 18, line 23, "where R ailcyl or aryl" should read -- where R is alkyl or aryl --.

Signed and Sealed this

Seventeenth Day of April, 2007

JON W. DUDAS
*Director of the United States Patent and Trademark Office*

UNITED STATES PATENT AND TRADEMARK OFFICE
CERTIFICATE OF CORRECTION

PATENT NO. : 7,169,887 B2  Page 1 of 1
APPLICATION NO. : 10/506541
DATED : January 30, 2007
INVENTOR(S) : Nicolai Papke It is certified that error appears in the above-identified patent and that said Letters Patent is hereby corrected as shown below:

In the Claims:

Column 17, on line 39, "The polyacetal molding composition as claimed in" should read -- The thermoplastic molding composition as claimed in --.

Column 17, on line 48, "The polyacetal molding composition as claimed in" should read -- The thermoplastic molding composition as claimed in --.

Column 18, on line 7, "The polyacetal molding composition as claimed in" should read -- The thermoplastic molding composition as claimed in --.

Column 18, on line 24, "The polyacetal molding composition as claimed in" should read -- The thermoplastic molding composition as claimed in --.

Column 18, on line 29, "The polyacetal molding composition as claimed in" should read -- The thermoplastic molding composition as claimed in --.

Signed and Sealed this

Twenty-second Day of January, 2008

JON W. DUDAS
*Director of the United States Patent and Trademark Office*